Oct. 30, 1951     S. BECKWITH     2,573,383
TOTALLY ENCLOSED DYNAMOELECTRIC MACHINE
UTILIZING A SINGLE COOLING FAN
Filed July 26, 1950     2 SHEETS—SHEET 2
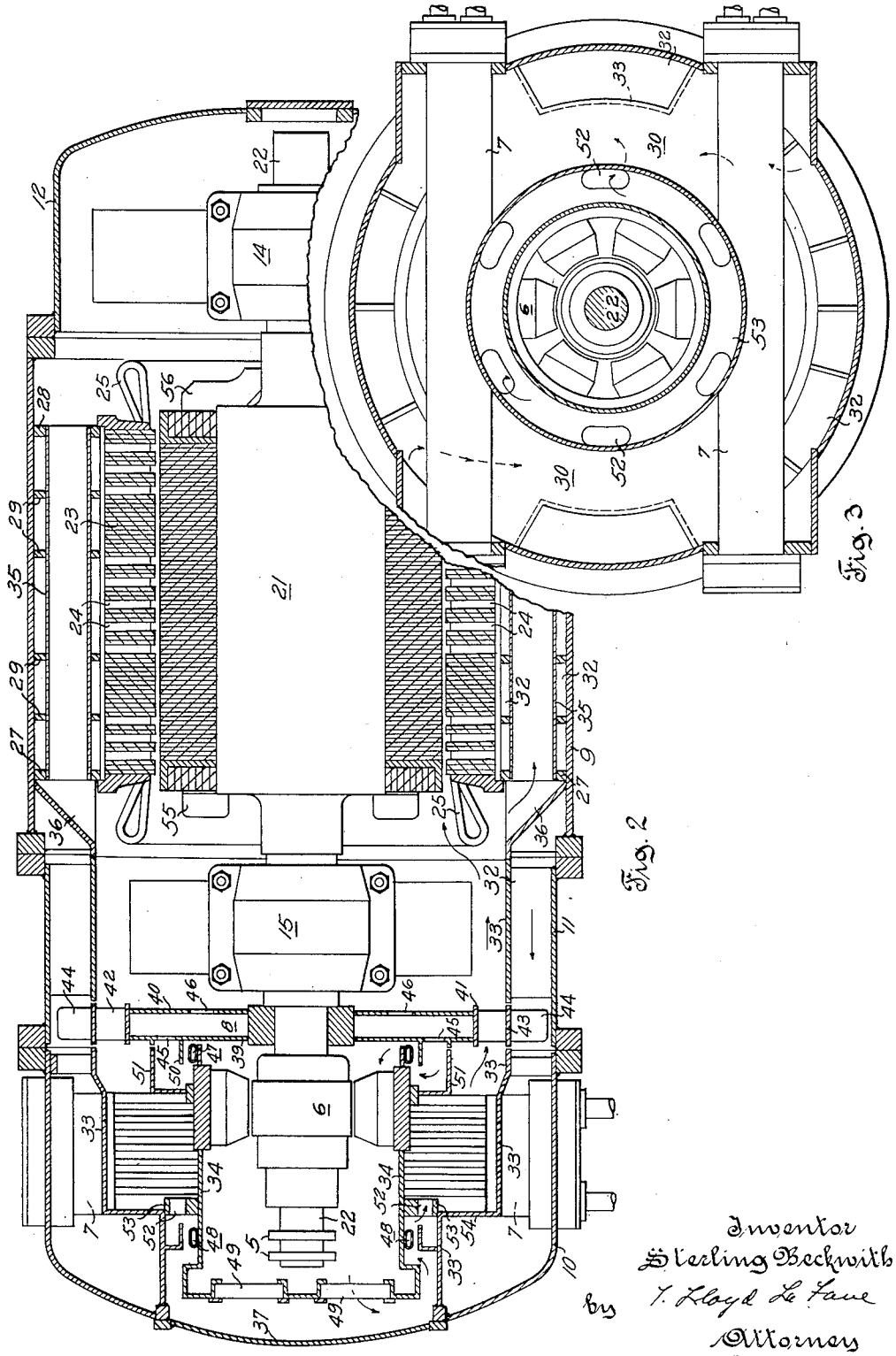
Inventor
Sterling Beckwith
by T. Lloyd LeFave
Attorney Patented Oct. 30, 1951

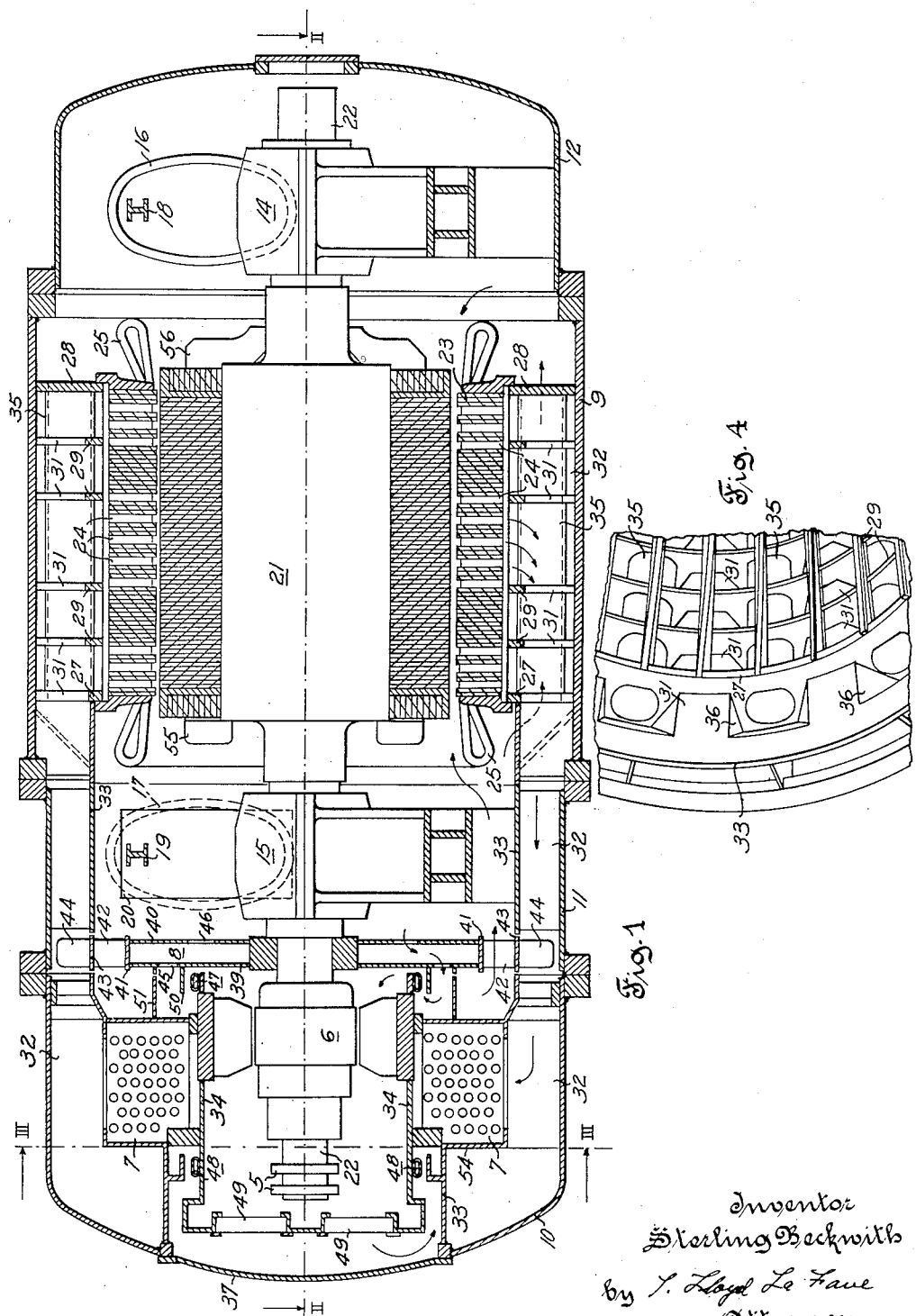

2,573,383

UNITED STATES PATENT OFFICE 2,573,383

TOTALLY ENCLOSED DYNAMOELECTRIC MACHINE UTILIZING A SINGLE COOLING FAN

Sterling Beckwith, Wauwatosa, Wis., assignor to Allis-Chalmers Manufacturing Company, Milwaukee, Wis.

Application July 26, 1950, Serial No. 175,910

11 Claims. (Cl. 171—252)

This invention relates to totally enclosed dynamoelectric machines and particularly to an improved ventilation arrangement thereof.

When hydrogen is used as the cooling medium, the machine must be totally enclosed in a gas tight housing in order to prevent escape of the gas or its contamination by air. Auxiliary devices such as a direct connected exciter and a current collecting device associated with the shaft of the machine are advantageously enclosed within the main casing to avoid use of complicated and expensive sealing devices to prevent leakage of the cooling gas from the housing along the shaft as would be the case when the shaft extends through the main housing.

The exciter is preferably enclosed within the main casing, and a separate housing is provided within the casing to enclose the exciter and the current collector for the dynamoelectric machine so that the exciter can be serviced without exhausting hydrogen ventilating gas from the main housing enclosing the dynamoelectric machine.

Economical design of the totally enclosed dynamoelectric machine is obtained if coolers for the ventilating gas are disposed at one end of the casing, a single fan is employed for circulating the ventilating gas to both ends of the casing for cooling the dynamoelectric machine and its auxiliary devices, and ducts are employed for directing the ventilating gas to both ends of the machine and returning it to the coolers.

It is an object of this invention to provide an improved ventilation system for a totally enclosed dynamoelectric machine and devices associated therewith enclosed in the same housing.

Another object of the present invention is to provide an improved totally enclosed dynamoelectric machine in which the auxiliary devices associated therewith are enclosed in the same housing and are further enclosed in gas tight relation therewith when the machine is shut down.

Another object of the invention is to provide a totally enclosed dynamoelectric machine with a single fan for circulating a ventilating medium through both ends of the machine enclosure.

Another object of the invention is to provide a gas tight casing for a dynamoelectric machine and a direct connected exciter and an end cover for an auxiliary housing enclosing the exciter to provide access thereto while maintaining the dynamoelectric machine totally enclosed.

Objects and advantages of the present invention other than those above set forth will be apparent from the following description when read in connection with the accompanying drawing, in which:

Fig. 1 is a sectional elevation of a hydrogen cooled totally enclosed synchronous condenser embodying the present invention;

Fig. 2 is a partial horizontal section taken along the line II—II of the machine shown in Fig. 1;

Fig. 3 is a cross sectional view taken along the line III—III of Fig. 1, and

Fig. 4 is a fragmentary perspective view of the stator housing of the machine of Fig. 1.

Referring to the drawing, the totally enclosed synchronous condenser unit shown comprises a dynamoelectric machine and auxiliary equipment therefor comprising current collector means 5, a direct connected exciter 6, coolers 7 of a suitable known type and a fan 8. The dynamoelectric machine and auxiliary equipment are all enclosed in a sectional type gas tight cylindrical casing or main housing, fillable with any suitable ventilating gas such as hydrogen circulated by the fan 8. The main housing comprises a central section 9 containing the dynamoelectric machine, an end section 10 containing the auxiliary equipment including the exciter, a section 11 between sections 10 and 9, containing the fan 8 and a front pedestal bearing 15, and a rear end section 12 which contains pedestal type bearing 14. Doors 16, 17 in the housing adjacent the bearings permit access thereto, and I-beams 18, 19, horizontally mounted in the housing above the bearings provide means for hoisting the bearing caps off the bearing bases and for removing the caps through the doors when so desired for maintenance or repair of the bearings.

The rotor member or field 21 of the machine having a shaft 22 is supported on the bearings 14, 15 and extends through the center section 9 of the main housing. The center section supports a conventional laminated stator core 23 having radial ventilating passages 24 and a winding 25 arranged in the slots of the core structure to form the stationary armature of the dynamoelectric machine. The core is mounted within a frame comprising annular front and rear end plates 27, 28 and annular intermediate plates 29, which are spaced axially along the center section and are secured thereto by welding. Longitudinal bars or runners extend across these plates for further securing and supporting the stator core.

Trapezoidal openings 31 are provided in each of the plates 27, 29, but not in rear plate 28, with the openings of each plate aligned with those of the next, to provide a channel 32 for directing ventilating gas, exhausted from the radial ventilating passages 24 of the stator core, forward along the housing. A stepped cylindrical shell 33, supported in the front and center sections 9, 11 of the main housing, extends from stator end plate 28 to the end of the housing section 10. However the shell is open to the outer side of the coolers 7 disposed in the housing portion 10 to connect the coolers with channel 32 formed between the stator core and the housing for directing the ventilating gas from the core to the coolers. The shell 33 has an opening aligned with door 17 and covered by a removable plate 20 for access through the shell as well as the casing to bearing 15.

A plurality of tubes 35 extend through all of the plates 27, 28, 29 supporting the stator core to form a longitudinal duct between each row of trapezoidal openings 31. The front end of each tube 35 opens in a hopper shaped structure 36 attached to the shell 33 and the open rear end of each tube 35 is fastened to plate 28. The tubes thus provide a path separated from the channel 32 and are used for directing a part of the ventilating gas from the space within shell 33 to the rear section of the main housing where the gas then enters axially into the dynamoelectric machine. Ventilating gas thus enters the machine axially from both ends.

One end of the rotor shaft extends beyond the front bearing 15 into an auxiliary or exciter housing 34 mounted within the housing portion 10. Housing portion 10 is provided with a cover 37 for access to the exciter. Current collector means comprising slip rings 5 for the dynamoelectric machine are mounted on the end of the shaft to cooperate with brush rigging (not shown) supported in the exciter housing. An exciter armature is mounted on the shaft between the slip rings 5 and the front bearing 15 to cooperate with an exciter field supported in the exciter housing. The commutator end of the exciter and its associated brush rigging (not shown) are adjacent the slip rings 5. The exciter armature is removably mounted on shaft 22 so that it may be removed for repairs when cover 37 has been removed.

Means for cooling the ventilating gas comprise the pair of coolers 7 disposed about the exciter housing transversely to the axis thereof. The coolers 7 are open on their radially outer and inner sides which form planes parallel to the axis of the machine, such that ventilating gas flows from channel 32 transversely through the coolers into the space 30 confined between the coolers, the exciter housing 34 and shell 33. An annular plate 54 forms the step of shell 33 to close the front sides of the coolers, thereby extending channel 32 for directing the ventilating gas into coolers 7. The rotary type fan 8 is mounted on the rotor shaft between the front bearing and the exciter for circulating the ventilating gas within the main housing and within the auxiliary housing 34 enclosing the exciter and current collector means.

The fan 8 is of large diameter and comprises a pair of spaced disk like members 39, 40, attached to a hub mounted on the shaft 22 and to a ring 41 which supports a first blading 42 for drawing ventilating gas from the coolers and forcing it to circulate in the housing. A second ring 43 disposed and secured about the periphery of the blading, aligns with the shell 33 in a gap thereof with close clearance to effectively make the shell or channel wall continuous through the fan. A second blading 44 is secured to outer ring 43. This second blading extends into the channel 32 and is disposed to move ventilating gas through the fan 8 in a direction opposite to the direction of movement of ventilating gas through the first blading. Fan disks 39, 40 have ports 45, 46, respectively, to admit ventilating gas from the main housing to the auxiliary housing 34, which is partly formed by the inner portion of disk 39.

The auxiliary housing may be closed to the main housing, when the machine is at a standstill, through any suitable known seals 47, 48. Each of these seals may consist of a flat annular resilient tube inserted in an annular gap between the auxiliary housing and an adjacent structure. Each tube may be inflated to close the gap in which it is inserted. Disk 39 of the fan has a flange 50 which cooperates with a seal 47, and shell 33 is provided with a flange which cooperates with seal 48.

A filter 49 is provided for the ventilating gas exhausted from the auxiliary housing while the machine is running and flowing through the gap provided at seal 48 into the space 30 and back to fan blading 42. A baffle 51 extending from the rear side of the cooler cooperates with an annular shoulder on fan disk 39 adjacent port 45 so that ventilating gas flowing from coolers 7 to fan blading 42 is separated from gas flowing into the auxiliary housing.

When the synchronous condenser unit is to be operated, the tubes of seals 47, 48 are collapsed. Fan 8 circulates the ventilating gas in two paths through the dynamoelectric machine and its exciter respectively. The first set of blading 42 draws ventilating gas from the coolers 7 and forces it about front bearing 15 toward the front of the synchronous dynamoelectric machine where a portion of the gas axially enters the air gap and the interpolar spaces of the rotating field member from the front thereof. Another portion of the gas enters the ducts 35 and flows to the rear of the machine, over and about the rear bearing 14, and axially enters the air gap and the interpolar spaces of the rotating field member from the rear thereof. The two portions of the gas mingle and flow radially outward through the radial ventilating passages 24 of the stator core, and into the channel 32. Ventilating gas flowing axially into the rotating field member from both ends thereof is further aided by the rotor fans 55, 56 provided at the ends of the rotating field.

The second set of blading 44 supplements the action of the first set of blading 42 in exhausting gas from the stator core, forcing it through coolers 7 for recirculation through the housing. The fan bladings 42 and 44 operate in series in the gas flow circuit including the stator core.

The ventilating gas is under a head of pressure, due to fan 8, so that a portion of the gas enters the auxiliary housing 34 through ports 46, 45 in fan 8 and the gap provided at seal 47. The gas circulates about the exciter armature and field members, over the exciter commutator and about slip rings 5, thence through filter 49 and the gap provided at seal 48, and through apertures 52 in a ring 53 surrounding the exciter housing, into space 30. In this space the gas from auxiliary housing 34 mixes with gas circulating in the main housing which has passed through coolers 7. Any dust particles carried away by the ventilating gas from the exciter commutator or current collector means are filtered out of the gas before it mixes with the gas from coolers 7.

Although but one embodiment of the present invention has been shown and described, it will be understood that changes and modifications may be made therein without departing from the spirit of the invention or the scope of the appended claims.

It is claimed and desired to secure by Letters Patent:

1. A totally enclosed dynamoelectric machine comprising a stator and a rotor, said rotor including a rotatable shaft, a gas tight housing enclosing said stator and said rotor and containing a ventilating gas, a fan mounted on said shaft, said fan comprising a first blading and a second blading mounted radially of said first blading, said bladings being oppositely directed to force said gas in opposite directions through said fan for circulating said gas through said housing, and means directing said gas from said first blading to both ends of said rotor, thence radially through said stator and axially through said housing to said second blading and back to said first blading, whereby said two bladings cooperate in circulating said gas in said machine.

2. A dynamoelectric machine comprising a stator having radial ventilating passages, a rotor comprising a rotatable shaft having front and rear ends, a front bearing and rear bearing supporting said respective ends of said shaft, said shaft extending in front of said front bearing, a fan mounted on said front shaft and adjacent to said front bearing for circulating gas through said machine, coolers disposed adjacent said fan, and a gas tight housing enclosing said stator, said rotor, said bearings, said fan, and said cooler, said housing having longitudinal channels connecting said radial ventilating passages with said coolers through said fan, said fan having a first blading and a second blading moving said gas in opposite directions through said fan, said first blading drawing gas from said coolers and forcing it into both ends of said machine and through said radial ventilating passages, said second blading exhausting said gas from said radial passages into said channels and through said second blading back to said coolers.

3. A gas cooled dynamoelectric machine comprising a stator provided with radial ventilating passages, a rotor, said rotor including a rotatable shaft, a bearing supporting said shaft in front of said rotor, said shaft having an end extending beyond said bearing, current collecting means and a direct connected exciter having an armature mounted on said shaft end, a rotary fan mounted on said shaft end between said bearing and said exciter for circulating said gas in said machine, a gas tight main housing for said machine enclosing said exciter and said current collector means, a cooler for said gas disposed in said main housing adjacent said exciter and said fan, an auxiliary gas tight housing within said main housing for enclosing said exciter and said current collecting means, seal means operable to open said auxiliary housing to said main housing when said machine is to be operated, means for directing said gas from said fan axially into said rotor member from both ends thereof, said means comprising a longitudinal duct disposed between said stator and said main housing and extending between ends of said stator, channel means formed adjacent said duct and between said stator and said main housing to connect with said radial ventilating passages and said cooler for exhausting said gas from said passages and directing it to said cooler, means directing gas from said main housing to said auxiliary housing enclosure and back to said main housing, said fan having first and second bladings for moving said gas in opposite directions through said fan, said first blading drawing gas from said cooler and forcing it into said main housing where it is directed in one path including said auxiliary housing enclosure and in another path including said rotor, said stator and said channel, a second blading extending into said channel for returning said gas to said cooler.

4. A totally enclosed gas cooled dynamoelectric machine comprising a gas tight housing, a stator, a rotor having a rotatable shaft, said stator and rotor mounted in said housing toward one end thereof, a cooler for said gas, said cooler mounted in said housing at the other end thereof, a single fan mounted on said shaft between said cooler and said machine for causing said gas to circulate in a circuit through said machine and said cooler, said fan including a first blading moving said gas from said cooler to both the near and far ends of said stator and a second blading moving said gas from said stator back to said cooler, and bypass means around said stator for said gas reaching said far end of said stator from said cooler.

5. A totally enclosed gas cooled dynamoelectric machine comprising a gas tight housing, a stator and a rotor, said rotor having a rotatable shaft, said stator and rotor disposed in said housing toward one end thereof, an exciter disposed in said housing at the other end thereof, and a single fan mounted on said shaft between said machine and said exciter, said fan having a first blading and a second blading disposed radially of one another, said first blading moving said gas in one direction through said fan and in two circuits within said housing, a first said circuit including said exciter and a second said circuit including said machine, and said second blading moving said gas in the opposite direction through said fan for aiding said first blading for moving said gas in said second circuit.

6. A totally enclosed dynamoelectric machine comprising a stator and a rotor, a gas tight housing enclosing said stator and said rotor and containing a ventilating gas, a fan mounted on said rotor, said fan comprising a first blading and a second blading mounted on said first blading, said bladings being oppositely directed to force said gas in opposite directions through said fan for circulating said gas through said housing, a cooler disposed at one end of said housing, and means directing said gas from one of said bladings into both ends of said stator, radially through said stator, axially through said housing, through said second blading, through said cooler and through said first blading, whereby said two bladings cooperate in circulating said gas in said machine.

7. A totally enclosed dynamoelectric machine, a gas tight main housing containing a ventilating gas, a stator in said housing, a rotor in said housing, said rotor including a rotatable shaft, an exciter enclosed in said main housing comprising an armature mounted on said rotor, current collecting means for said rotor mounted on said shaft, an auxiliary housing enclosing said exciter and said current collecting means within said main housing, cooling means disposed in said main housing, a removable cover on said auxiliary housing for access to said current collecting means and to said exciter armature and commutator which may be inserted or removed through said cover, and means for circulating said ventilating gas in two paths within said main housing, one of said paths including said stator and said cooling means, the other said path including said auxiliary housing.

8. A dynamoelectric machine comprising a gas tight main housing containing a ventilating gas, a stator, a rotor including a rotatable shaft, an exciter comprising an armature mounted on said shaft, current collecting means for said rotor mounted on said shaft, a fan mounted on said shaft between said exciter and said rotor, an auxiliary housing within said main housing, said auxiliary housing enclosing said exciter and said current collecting means, said fan comprising a web defining a portion of said auxiliary housing, seal means for said auxiliary housing operable to open said auxiliary housing to said main housing when said machine is to be operated, and means comprising said fan for circulating said ventilating gas within both said main housing and said auxiliary housing.

9. A dynamoelectric machine comprising a main housing for containing a ventilating gas, said main housing including a wall having an edge defining an aperture, a stator, a rotor including a rotatable shaft, an exciter comprising an armature mounted on said shaft, current collecting means for said rotor mounted on said shaft, an auxiliary housing joining said main housing along said edge of said aperture, said auxiliary housing enclosing said exciter and said current collecting means, a gas tight cover for said auxiliary housing, said cover being removable for access to said auxiliary housing, means having nested cylindrical surfaces coaxial with said shaft defining an annular port in said auxiliary housing for the passage of said ventilating gas between said main housing and said auxiliary housing, a fan mounted on said shaft between said rotor and said auxiliary housing for causing said ventilating gas to circulate in both said main housing and said auxiliary housing, and seal means including an inflatable annular diaphragm coaxial with said shaft disposed in said port, said diaphragm upon being deflated being operable to open said port when said machine is to be operated and upon being inflated being operable to close said port to prevent the passage of ventilating gas from said main housing to said auxiliary housing when said machine is not being operated and said cover is to be removed.

10. A totally enclosed dynamoelectric machine comprising a main housing for containing a ventilating gas, said main housing including a wall having an edge defining an aperture, a stator and a rotor in one end of said main housing, said rotor including a rotatable shaft which extends to the other end of said main housing, an exciter comprising an armature mounted on said shaft in said other end of said main housing, current collecting means for said rotor mounted on said shaft adjacent said armature, an auxiliary housing enclosing said exciter and said current collecting means joining said main housing along said edge of said aperture, a removable gas tight cover on said auxiliary housing for providing access to said current collecting means, means having nested cylindrical surfaces coaxial with said shaft defining an annular entrance port and an annular exit port in said auxiliary housing, a fan mounted on said shaft between said rotor and said auxiliary housing to cause said ventilating gas to circulate in said main housing and to flow from said main housing in a path through said entrance port, said auxiliary housing, and said exit port back to said main housing, and seal means comprising inflatable annular tubular diaphragms disposed in said ports and secured radially of said auxiliary housing, said seal means operable to open said auxiliary housing to said main housing when said machine is to be operated, and said seal means operable to close said auxiliary housing to said main housing when said machine is not to be operated, whereby said cover may be removed for access to said auxiliary housing independently of said main housing.

11. A totally enclosed dynamoelectric machine comprising a main housing for containing a ventilating gas, said main housing including a wall having an edge defining an aperture, a stator and a rotor in one end of said main housing, said rotor including a rotatable shaft which extends to the other end of said main housing, an exciter comprising an armature mounted on said shaft in said other end of said main housing, current collecting means for said rotor mounted on said shaft adjacent said armature, an auxiliary housing enclosing said exciter and said current collecting means joining said main housing along said edge of said aperture, a removable gas tight cover on said auxiliary housing for providing access to said auxiliary housing, a fan mounted on said shaft between said rotor and said auxiliary housing, means having nested cylindrical surfaces coaxial with said shaft defining an annular entrance port and an annular exit port in said auxiliary housing, said means comprising a cylindrical surface of said fan and a cylindrical surface of said auxiliary housing defining said entrance port, and seal means comprising inflatable annular diaphragm disposed in said ports, said seal means operable to open said ports when said machine is to be operated causing said fan to circulate said ventilating gas in said main housing and from said main housing in a path through said entrance port, said auxiliary housing, and said exit port back to said main housing, and said seal means operable to close said auxiliary housing to said main housing to prevent the passage of ventilating gas from said main housing to said auxiliary housing when said machine is not being operated and said cover is to be removed.

STERLING BECKWITH.

REFERENCES CITED

The following references are of record in the file of this patent:

UNITED STATES PATENTS

| Number | Name | Date |
|---|---|---|
| 1,672,272 | Moore | June 5, 1928 |
| 1,848,511 | Adamcikas | Mar. 8, 1932 |
| 1,991,194 | Child | Feb. 12, 1935 |
| 2,315,653 | Pollard | Apr. 6, 1943 |
| 2,417,783 | Pollard | Mar. 18, 1947 |
| 2,422,824 | Clauson | June 24, 1947 |